US005721201A

United States Patent [19]
Tomassen et al.

[11] Patent Number: 5,721,201
[45] Date of Patent: Feb. 24, 1998

[54] POLYMERIC FLOW IMPROVER ADDITIVES

[75] Inventors: Henricus Paulus Maria Tomassen; Christinus Cornelis van de Kamp; Marinus Johannes Reynhout, all of Amsterdam, Netherlands; Jian Lin, Maidstone, United Kingdom

[73] Assignee: Shell Oil Company, Houston, Tex.

[21] Appl. No.: 746,824

[22] Filed: Nov. 18, 1996

Related U.S. Application Data

[63] Continuation of Ser. No. 280,631, Jul. 26, 1994, abandoned.

[30] Foreign Application Priority Data

Jul. 27, 1993 [EP] European Pat. Off. ............ 93305917

[51] Int. Cl.$^6$ ................................................ C10M 145/14
[52] U.S. Cl. ......................... 508/469; 526/271; 526/318
[58] Field of Search ........................ 508/469; 526/271, 526/318

[56] References Cited

U.S. PATENT DOCUMENTS

| | | | |
|---|---|---|---|
| 4,663,491 | 5/1987 | Barthell et al. | 585/3 |
| 5,178,641 | 1/1993 | Konrad et al. | 44/392 |
| 5,349,019 | 9/1994 | Wirtz et al. | 252/56 R |

OTHER PUBLICATIONS

A. I. Akhmedov et al., Neftekhimiya 23, No. 5, 696–699, 1983, "Synthesis and study of additives based on decyl methacrylate–maleic anhydride copolymers" (Russian article, English Abstract, English translation) Month Unavailable.

*Primary Examiner*—Jacqueline V. Howard

[57] ABSTRACT

The present invention provides a copolymer of at least one n-($C_8$–$C_{30}$-alkyl) (meth)acrylate with maleic anhydride, which contains alternating (meth)acrylate and maleic anhydride monomeric units, characterized in that the copolymer has a degree of alternation of at least 85%, a process for preparing the copolymer, a hydrocarbon oil composition containing the copolymer and the use of the copolymer as a flow improver additive.

28 Claims, No Drawings

POLYMERIC FLOW IMPROVER ADDITIVES

This is a continuation of application Ser. No. 08/280,631, filed Jul. 26, 1994, now abandoned.

FIELD OF THE INVENTION

The present invention relates to copolymers of n-alkyl (meth)-acrylates with maleic anhydride, a process for their preparation, hydrocarbon oil compositions containing them and their use as flow improver additives.

1. Description of the Prior Art

Hydrocarbon oils such as gas oils, diesel oils, fuel oils, lubricating oils and crude oils contain varying amounts of paraffins. The proportion of long chain n-paraffins, in particular, determines the cold-flow behavior of the oils. On cooling, the n-paraffins separate out as plate-like crystals which interact together to form a three-dimensional network in which still liquid oil becomes trapped, resulting in increased oil viscosity and decreased oil flowability. In gas oil and diesel oil applications, this phenomenon results in filter blockage, whereas in crude oil applications, it results in the gellation of the crude oil and the formation of deposits in pipelines and storage tanks leading to considerable losses in production and capacity.

It is well known that these problems can be alleviated by the addition of so-called flow improvers to such oils. There are two kinds of flow improver: nucleation modifiers and growth modifiers. Nucleation modifiers promote the formation of many small paraffin crystals whereas growth modifiers promote the formation of larger crystal clusters. In both cases however, the plate-like crystals described above are not formed. Nucleation modifiers find application in gas oils and diesel oils since the paraffin crystals formed are sufficiently small enough to pass through a filter. Growth modifiers, by contrast, are used in filter-free applications, e.g. in crude oils.

U.S. Pat. No. 4,663,491 discloses the use as crystallization inhibitors in crude oil of copolymers of maleic anhydride and n-alkyl acrylates of the general formula

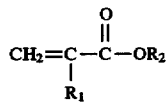

in which:

$R_1$ represents hydrogen or methyl and $R_2$ represents an n-alkyl radical having at least 16, preferably from 16 to 30, carbon atoms.

The copolymers are prepared by a process which comprises first mixing the total charge of n-alkyl acrylate with the total charge of maleic anhydride (the molar ratio acrylate: anhydride being in the range from 20:1 to 1:10, preferably from 8:1 to 1:5 and especially from 4:1 to 1:1), and heating the mixture, in the presence of an organosoluble radical-forming catalyst, at a temperature in the range from 50° to 150° C., preferably from 80° to 120° C. It is clear from the examples of the patent that the most preferred temperatures are in the range from 85° to 95° C. At such temperatures, the reaction is complete in about 4 hours.

No information is provided in the patent of the composition (e.g. the molar percentages of n-alkyl acrylate and maleic anhydride monomers) or of the structure of the copolymers obtained by the above process. However, the known higher reactivity of n-alkyl acrylate monomers and their much greater tendency to homopolymerize than maleic anhydride monomers will, in view of the initial mixing of the total charge of n-alkyl acrylate with the total charge of maleic anhydride, result in the copolymer obtained containing proportionally more n-alkyl acrylate than maleic anhydride and having a structure which is not highly uniform.

A. I. Akhmedov et al., Neftekhimiya 23, No. 5, 696–699, 1983, "Synthesis and study of additives based on decyl methacrylate- maleic anhydride copolymers" discloses the preparation of lubricating oil additives having both viscosity index improving and detergent-dispersant properties, by copolymerization of decyl methacrylate with maleic anhydride and subsequent treatment with amines. Copolymerization of decyl methacrylate with maleic anhydride was carried out in the presence of benzoyl peroxide as initiator in a toluene solution, the optimal conditions for which consisted of heating a 50% w toluene solution of a mixture containing 90% w decyl methacrylate and 10% w maleic anhydride (corresponding to a molar ratio decyl methacrylate to maleic anhydride of 3.9:1) at 80° C. for 3 hours in the presence of 0.5% w initiator. It was found that increasing the quantity of maleic anhydride in the monomer mixture to 20% w or more had a detrimental effect on the solubility of the end product in mineral oils.

Akhmedov et al. state that the constants of copolymerization (r) of the monomers being investigated were 1.75 for decyl methacrylate and 0 for maleic anhydride.

According to Akhmedov et al., the product of the values of the constants of copolymerization is thus equal to zero, which points to formation of a copolymer with alternating monomeric units. This conclusion is supported by the fact that maleic anhydride does not form a homopolymer under these reaction conditions.

Akhmedov et al. further state that the structure of the copolymers was confirmed spectrally, and the composition by the value of the acid number. Copolymers were obtained with molecular weight 7000–17000, maleic anhydride content 8–36% w, acid number 46–105 mg KOH/g and yield of 80–96%.

A perfectly alternating copolymer (100% alternation) of decyl methacrylate and maleic anhydride would contain 50 mol % of each monomer. A copolymer containing a lower molar percentage of maleic anhydride would inevitably have a lower degree of alternation (<100%). The copolymers obtained contained 8 to 36% w maleic anhydride which corresponds to 16.7 to 56.5 mol % maleic anhydride. Bearing in mind that maleic anhydride is said not to form a homopolymer under the reaction conditions used, an observed maleic anhydride content of greater than 50 mol % strongly suggests that this parameter was calculated on the basis of the crude, rather than the pure, copolymer product, and this crude product would naturally have contained some free (unreacted) maleic anhydride. Thus, the maleic anhydride contents quoted would appear to be higher than would actually have been the case. It is not possible, however, on the basis of the information available, to calculate the actual content of maleic anhydride moieties and hence the possible degrees of alternation in the copolymers. Notwithstanding this, in view of the fact that decyl methacrylate is more reactive and has a much greater tendency to homopolymerize than maleic anhydride, that it was used in considerable excess in the process (molar ratio decyl methacrylate to maleic anhydride 3.9:1), and that the total charge of decyl methacrylate was mixed with the total charge of maleic anhydride at the start of the process, the copolymers would be expected to contain low rather than high degrees of alternation.

EP-A-485,773 discloses petroleum middle distillates containing small amounts of (A) known flow-improvers based on ethylene and (B) copolymers consisting of 10 to 95 mol % of one or more alkyl acrylates or alkyl methacrylates with $C_1$- to C26-alkyl chains and of 5 to 90 mol % of one or more ethylenically unsaturated dicarboxylic acids or their anhydrides, the copolymer having been extensively reacted with one or more primary or secondary amines to give the monoamide or amide/ammonium salt of the dicarboxylic acid.

The copolymers B contain from 10 to 95, preferably 40 to 95, and most preferably 60 to 90, mol % of the one or more alkyl (meth)acrylates and from 5 to 90, preferably 5 to 60, and most preferably 10 to 40, mol % of the one or more ethylenically unsaturated dicarboxylic acids or anhydrides.

The alkyl groups of the alkyl (meth)acrylates are said to contain from 1 to 26, preferably 4 to 22, and most preferably 8 to 18, carbon atoms. The alkyl groups are preferably straight-chained and unbranched. However, up to 20% w of cyclic and/or branched alkyl components may be present.

Examples of particularly preferred alkyl (meth)acrylates are listed as n-octyl (meth)acrylate, n-decyl (meth)acrylate, n-dodecyl (meth)acrylate, n-tetradecyl (meth)acrylate, n-hexadecyl (meth)acrylate and n-octadecyl (meth)acrylate and mixtures of these.

Examples of ethylenically unsaturated dicarboxylic acids are said to be maleic acid, tetrahydrophthalic acid, citraconic acid and itaconic acid and their anhydrides as well as fumaric acid. Maleic anhydride is preferred.

The copolymers B are prepared by polymerizing the one or more alkyl (meth)acrylates with the one or more ethylenically unsaturated dicarboxylic acids or anhydrides and reacting the copolymer obtained with a suitable amine. The first stage in the preparation may be carried out using discontinuous or continuous polymerization processes such as mass, suspension, precipitation or solution polymerization, initiated using the usual radical donors. Solution polymerization is the preferred method.

At page 5, lines 22 to 46 of EP-A-485,773, it is stated that solution polymerization is carried out in solvents in which the monomers and the copolymers formed are soluble. All solvents are suitable for this which meet this criterion and do not react with the monomers. Examples are toluene, xylene, ethylbenzene, cumene, high boiling point mixtures of aromatics such as "SOLVESSO" (trade mark) 100, 150 and 200, aliphatic and cycloaliphatic hydrocarbons such as n-hexane, cyclohexane, methylcyclohexane, n-octane, iso-octane, paraffin oils, "SHELLSOL" (trade mark) TD, T and K, tetrahydrofuran and dioxan. Tetrahydrofuran and dioxan are particularly suitable for producing low molecular weight copolymers. When carrying out solution polymerization it is good practice to start with part of the monomer mixture (e.g. ca 5 to 20%) in the reactor and add to it the rest of the monomer mixture with the initiator and, if used, coinitiator, regulator and solvent. The monomers can also be added individually at different speeds. This is recommended in the case of monomers with very different reactivities, as is the case with (meth)acrylates and unsaturated dicarboxylic acids or their anhydrides and if a particularly uniform distribution of the less reactive monomer in the polymer is wanted. In this case the less reactive monomer is added more rapidly and the more reactive monomer more slowly. It is also possible to start with the whole amount of a monomer, preferably the less-reactive anhydride, and add only the (meth)acrylate. Finally, it is also possible to start with all the monomer and the solvent and add only the initiator and, if used, coinitiator and regulator (batch procedure). When carrying out this procedure on a large scale problems can arise, however, with removing the heat so that this procedure should be used only in the case of low concentrations of the monomers to be polymerized. The concentrations of the monomers to be polymerized are between 10 and 80% w, preferably 30 and 70% w. The solid copolymer can be obtained without problems by evaporating the solvent. It is, however, good practice to choose for the polymerization a solvent in which the reaction with the amines can take place and which is miscible with the middle distillate, so that the polymer solution can be added directly to the middle distillate.

In the above passage, it is stated that by adding the alkyl (meth)acrylate and ethylenically unsaturated dicarboxylic acid/anhydride monomers at different speeds during the reaction, a polymer containing a particularly uniform distribution of the less reactive monomer can be obtained, the implication being that the procedure leads to polymers containing comparable amounts of the different monomers. There is no teaching in this document concerning desirability or otherwise of particular degrees of alternation in polymer structure and, in particular, there is no suggestion that any polymer formed by solution polymerization would, or desirably should, have a highly alternating structure.

Examples 1 to 6 in EP-A-485,773 relate to the preparation of polymers of alkyl (meth)acrylates with maleic anhydride, whilst Examples 7 to 18 which follow relate to the reaction of those polymers with amines to form the copolymers B.

In each of Examples 1 to 5, a batch solution polymerization process was used. The polymers obtained in Examples 1 to 5 contained molar ratios acrylate to maleic anhydride in the range from 80:20 to 40:60. No information is given on the structure of the polymers. Assuming, however, polymers containing alternating monomeric units had been formed, the maximum degree of alternation in the polymers would vary between 40% (based on 80:20 molar ratio) and 80% (based on 40:60 molar ratio).

It has now surprisingly been found possible to prepare copolymers of n-alkyl (meth)acrylates and maleic anhydride which have a structure consisting substantially of alternating (meth)acrylate and maleic anhydride monomeric units, resulting in advantageous flow improver activity in a wide range of hydrocarbon oils.

SUMMARY OF THE INVENTION

The present invention relates to a copolymer of at least one n-($C_8$–$C_{30}$-alkyl) (meth)acrylate with maleic anhydride, which contains alternating (meth)acrylate and maleic anhydride monomeric units, characterized in that the copolymer has a degree of alternation of at least 85%. The present invention further relates to a process for the preparation of the copolymer of at least one n-($C_8$–$C_{30}$-alkyl) (meth) acrylate with maleic anhydride, a hydrocarbon oil composition containing this copolymer and its use as a flow improver additive.

DESCRIPTION OF THE PREFERRED EMBODIMENTS

In accordance with the present invention, there is provided a copolymer of at least one n-($C_8$–$C_{30}$-alkyl) (meth) acrylate with maleic anhydride, which contains alternating (meth)acrylate and maleic anhydride monomeric units, characterized in that the copolymer has a degree of alternation of at least 85%.

Preferred copolymers are those prepared from one or more n-($C_{10}$–$C_{30}$-alkyl) (meth)acrylates, most preferably one or more n-($C_{12}$–$C_{24}$-alkyl) (meth)acrylates. Acrylates are most preferred.

The degree of alternation in the copolymers can be readily determined by quantitative $C^{13}$ Nuclear Magnetic Resonance Spectroscopy (NMR). Thus, a sample of pure copolymer is dissolved in deuterated chloroform containing 0.15M 2,2,6,6-tetramethyl-1-piperidinyloxy (TEMPO) and is subsequently analyzed by NMR. From the NMR spectrum obtained, the ratio a/b of the integrals in the carbonyl (CO) region at 172-174 ppm (a) and in the ester ($OCH_2$) region at about 65 ppm (b) is calculated. In the case of a homopoly (meth)acrylate, there is one carbonyl carbon for every $OCH_2$ carbon, so that the ratio a/b is 1. By comparison, in the case of a perfectly alternating copolymer of n-alkyl (meth) acrylate with maleic anhydride, there are three carbonyl carbons for every $OCH_2$ carbon, so that the ratio a/b is 3. In the case where a copolymer of n-alkyl (meth)acrylate with maleic anhydride contains y perfectly alternating segments and 1−y acrylate segments (y×100% represents the degree of alternation as a percentage), then there are 3y+(1−y), i.e. 2y+1, carbonyl carbons for every y+(1−y), i.e. 1, $OCH_2$ carbon, so that the ratio a/b is 2y+1 (or y is (a/b−1)/2).

The latter expression is based on the understanding that maleic anhydride has an extremely low tendency to homopolymerize. This was confirmed in control experiments carried out under the same polymerization conditions as used in the preparation of the copolymers according to the present invention, in which no oligomers or polymers of maleic anhydride were formed.

The above explanation of the calculation of the degree of alternation may be more readily understood by reference to the following structural representations:

$$\begin{array}{c} -CH_2-CH- \\ | \\ CO_2CH_2(CH_2)_nCH_3 \end{array} \quad (A)$$

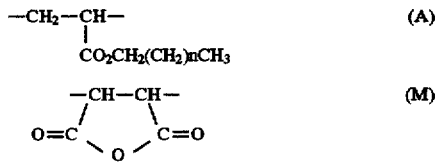

"A" represents an acrylate monomeric unit in which "n" is an integer in the range from 6 to 28, and "M" represents a maleic anhydride monomeric unit.

For:

AAAAAAAA ..., $C = O/OCH_2 = 1$

AMAMAMAM ..., $C = O/OCH_2 = 3$ $(AM)_y(A)_{1-y}$, $C = O/OCH_2 = \dfrac{3y+(1-y)}{y+(1-y)} = 2y+1$ The degree of alternation in the copolymers of the present invention is preferably at least 86%, more preferably at least 88%, and especially at least 90%.

The present invention also provides a process for the preparation of a copolymer according to the invention which comprises reacting at least one n-($C_8$-$C_{30}$-alkyl) (meth) acrylate with maleic anhydride in the presence of a radical-forming initiator, characterized in that a predetermined molar amount of the (meth)acrylate is dosed to a predetermined molar amount of the maleic anhydride at a dosage rate of 20 to 100 mol % (meth)acrylate per hour, and that the ratio of the predetermined molar amount of (meth)acrylate to the predetermined molar amount of maleic anhydride is in the range from 1:1 to 1:5.

The n-($C_8$-$C_{30}$-alkyl) (meth)acrylates used in the process of the present invention are known compounds or can be prepared by processes analogous to known processes. Thus, the (meth)acrylates may conveniently be prepared by an esterification process in which (meth)acrylic acid is heated together with one or more $C_8$-$C_{30}$ n-alkanols in an azeotropic solvent such as toluene, in the presence of an esterification catalyst, e.g. p-toluenesulphonic acid, and a polymerization inhibitor, e.g. copper (II) acetate, with removal of water. The esterification reaction is typically carried out at a temperature in the range from 70° to 90° C. under 20 kPa vacuum.

Preferred (meth)acrylates are those prepared from $C_{12}$-$C_{24}$ n-alkanols, e.g. 1-dodecanol, or a mixture of $C_{12}$-$C_{15}$ n-alkanols which is available from member companies of the Royal Dutch/Shell Group under the trade mark "DOBANOL 25", or a mixture of $C_{16}$-$C_{24}$ n-alkanols which is available from Sidobre Sinnova (France) as "Behenyl Alcohol X5".

Examples of radical-forming initiators include benzoyl peroxide, di-tert-butyl peroxide, acetyl peroxide, acetyl benzoyl peroxide and α,α'-azoisobutyronitrile. Further examples of radical-forming initiators are mentioned in EP-A-485,773.

The radical-forming initiator is conveniently used in an amount from 1 to 10 mol %, preferably from 1 to 5 mol %, and most preferably from 1.5 to 3 mol %, based on (meth) acrylate. The radical-forming initiator may be added as a single portion, or, alternatively, may be divided into two or more portions which are added at different stages during the course of the reaction. The initiator is conveniently added in two portions, the first portion containing 65 to 75%, and the second portion containing 25 to 35%, of the total intake of initiator.

The process of the invention is conveniently carried out in the presence of a solvent. Suitable solvents include hydrocarbons such as toluene, xylene, ethylbenzene, hexane, octane, cyclohexane and those sold by member companies of the Royal Dutch/Shell group under the trade mark "SHELLSOL"; and ethers, particularly tetrahydrofuran and dioxan. The reaction is carried out at a temperature preferably in the range from 60° to 90° C., more preferably from 70° to 80° C.

In the process of the invention, a predetermined molar amount of at least one n-($C_8$-$C_{30}$-alkyl) (meth)acrylate is dosed to a predetermined molar amount of maleic anhydride at a dosage rate of 20 to 100 mol %, preferably 40 to 80 mol %, and especially 60 mol %, (meth)acrylate per hour.

The ratio of the predetermined molar amount of (meth) acrylate to the predetermined molar amount of maleic anhydride is in the range from 1:1 to 1:5, preferably from 1:1 to 1:3, more preferably from 1:1 to 1:1.5, and is especially 1:1.

The number average molecular weights ($M_n$) of the copolymers of the present invention obtained by the above process may vary within wide limits. For example, the copolymers may have number average molecular weights up to 100,000, e.g. in the range from 500 to 100,000, preferably from 1,000 to 50,000, more preferably from 1,000 to 35,000, still more preferably from 1,000 to 20,000, and advantageously from 4,500 to 10,000. Such number average molecular weights may conveniently be determined by gel permeation chromatography (GPC) against polystyrene standards.

The copolymers of the present invention are useful as additives in hydrocarbon oils such as gas oils, diesel oils, fuel oils, lubricating oils and crude oils. Particularly advantageous results are obtained when the copolymers are used in gas oils and crude oils. Thus, the present invention further provides a hydrocarbon oil composition comprising a major amount of a hydrocarbon oil and a minor amount of a copolymer according to the invention. The copolymer is used in an amount of 0.1 to 10,000 mg per kg hydrocarbon oil. Preferably 1 to 5,000, more preferably 10 to 3,000, and in particular 20 to 2,000, mg copolymer per kg hydrocarbon oil are used.

The hydrocarbon oil compositions may, depending on their end-use, contain various other additives such as dispersants, detergents, corrosion inhibitors and viscosity-index improvers.

The present invention still further provides the use of a copolymer of the invention as a flow improver additive.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The present invention will be further understood from the following examples which are provided for illustrative purposes and are not to be construed as limiting the invention.

EXAMPLES

Example 1

Preparation of a highly alternating copolymer of $C_{12}$–$C_{15}$-alkyl acrylate and maleic anhydride 9.8 g (0.1 mol) maleic anhydride (MALA) and 50 g toluene were introduced into a double walled glass reactor equipped with an overhead stirrer, an argon inlet, a condenser and an inlet connection for a perfusion pump. The reactor was purged with argon and a slight flow of argon was maintained throughout the entire reaction. The mixture in the reactor was heated, with stirring, to a temperature of about 80° C. by circulating silicon oil from a thermostatted bath. When all the maleic anhydride had melted and dissolved, a portion of α,α'-azoisobutyronitrile (AIBN) in toluene was introduced into the reactor using a syringe. This portion consisted of 75% of the total AIBN intake of 0.24 g (1.5 mol % based on acrylate intake) in 5.4 g toluene.

100 ml of a solution of 26.1 g (0.1 mol) $C_{12}$–$C_{15}$-alkyl acrylate (being the reaction product of acrylic acid and a mixture of $C_{12}$–$C_{15}$ n-alkanols available from member companies of the Royal Dutch/Shell Group under the trade mark "DOBANOL 25") in toluene was subsequently dosed to the reaction mixture over a period of 100 minutes (molar ratio acrylate:MALA of 1:1; dosage rate of 60 mol % acrylate per hour). On completion of the acrylate addition, the remaining portion of AIBN solution (25%) was immediately introduced into the reactor and the reaction was left to continue for a further 4 hours. On cooling to below 60° C., the crude reaction product containing the highly alternating copolymer of $C_{12}$–$C_{15}$-alkyl acrylate and maleic anhydride was collected and analyzed by gel permeation chromatography (GPC) against polystyrene standards. The copolymer was found to have a number average molecular weight ($M_n$) of 7,700. Purification of the crude product by dialysis followed by analysis by Nuclear Magnetic Resonance (NMR) revealed the degree of alternation in the copolymer to be 90%.

Example 2

Example 1 was repeated with the following exceptions: 9.8 g maleic anhydride in 20 g toluene was used and the $C_{12}$–$C_{15}$-alkyl acrylate was replaced by $C_{12}$-alkyl acrylate (molar ratio acrylate: MALA of 1:1). The copolymer of $C_{12}$-alkyl acrylate and maleic anhydride obtained had $M_n$ 4,900 (determined by GPC on the crude product) and a degree of alternation of 100% (calculated on the purified product).

Example 3

Example 1 was repeated with the following exceptions: 9.8 g maleic anhydride in 20 g toluene was used and the $C_{12}$–$C_{15}$-alkyl acrylate was replaced by $C_{16}$–$C_{24}$-alkyl acrylate (being the reaction production of acrylic acid and a mixture of $C_{16}$–$C_{24}$ alcohols commercially available from Sidobre Sinnova (France) as "Behenyl Alcohol X5"). The molar ratio acrylate:MALA was 1:1. The copolymer of $C_{16}$–$C_{24}$-alkyl acrylate and maleic anhydride obtained had $M_n$ 9,000 (determined by GPC on the crude product) and a degree of alternation of 100% (calculated on the purified product).

Comparative Example A

A copolymer of $C_{12}$–$C_{15}$-alkyl acrylate and maleic anhydride was prepared in accordance with the teaching of U.S. Pat. No. 4,663,49. Thus, 9.8 g (0.1 mol) maleic anhydride (MALA), 104.4 g (0.4 mol) of the $C_{12}$–$C_{15}$-alkyl acrylate described in Example 1 above (molar ratio acrylate:MALA of 4:1) and 114 g toluene were introduced into a reaction flask and the contents heated, with stirring, to 85° C. in an inert argon atmosphere. A solution of 0.3 g, '-azoisobutyronitrile (AIBN) in 6 ml toluene was divided into 6 portions and the individual portions were added to the reaction mixture at half hourly intervals. The total reaction time was 4 hours. Once cooled, the crude reaction product containing a copolymer of $C_{12}$–$C_{15}$-alkyl acrylate and maleic anhydride was collected and analyzed by gel permeation chromatography (GPC) against polystyrene standards. The copolymer was found to have a number average molecular weight ($M_n$) of 23,700. Purification of the crude product by dialysis followed by analysis by Nuclear Magnetic Resonance (NMR) revealed the degree of alternation in the copolymer to be 34%.

Comparative Example B

The procedure described in Comparative Example A was repeated except that the molar ratio acrylate:MALA was 1:1 and only 36 g toluene were used. The copolymer of $C_{12}$–$C_{15}$-alkyl Example 4

Solutions of the copolymers of Examples 1 to 3 and of Comparative Examples A to C in toluene (50% by weight) were incorporated into seven gas oils (a,b,c,d,e,f and g) preheated to 50° C. and the pour points (PP) and/or cold filter plugging points (CFPP) of the resulting compositions were determined according to standard test methods ASTM D97-66 and IP 309/83 respectively. The PP and CFPP values obtained are shown in Table I below. In this table, the amount of copolymer solution added to the gas oil is expressed as mg polymer solution per kg gas oil ("Solution mg/kg").

Gas oil a was a French industrial gas oil having density at 15° C. of 870 kg/m³, viscosity at 40° C. of 3.65 mm²/s, sulphur content of 0.3% w and a boiling point range: 10%=184° C., 50%=272° C. and 90%=368° C.

Gas oil b was a French industrial gas oil having density at 15° C. of 843 kg/m³, viscosity at 40° C. of 3.54 mm²/s and sulphur content of <0.3% w.

Gas oil c was a French industrial gas oil having density at 15° C. of 853 kg/m³ viscosity at 40° C. of 3 82 mm²/s and sulphur content of <0.3% w.

Gas oil d was a French automotive gas oil having density at 15° C. of 841 kg/m³ viscosity at 40° C. of 3.46 mm²/s and sulphur content of <0.5% w. acrylate and maleic anhydride obtained had $M_n$ 9,450 (determined by GPC on the crude product) and a degree of alternation of 78% (calculated on the purified product).

Comparative Example C

In a manner analogous to the procedure of Example 2 in U.S. Pat. No. 4,663,491, 65.25 g (0.25 mol) $C_{12}$–$C_{15}$-alkyl acrylate as described in Example 1 above and 24.5 g (0.25 mol) maleic anhydride (MALA) (molar ratio acrylate-:MALA of 1:1) were placed in a reaction flask and heated to 85° C. in a nitrogen atmosphere. At that temperature, 0.15 g of, '-azoisobutyronitrile (AIBN) in 3 ml toluene was added and a temperature increase was observed. After cooling to 95° C. further amounts of AIBN were added in five metered portions until a total of 0.75 g AIBN dissolved in 15 ml toluene had been consumed. The total reaction time was 4 hours. Once cooled, the crude reaction product containing a copolymer of $C_{12}$–$C_{15}$-alkyl acrylate and maleic anhydride was collected and analyzed by gel permeation chromatography against polystyrene standards. The copolymer was found to have a number average molecular weight ($M_n$) of 12,500. Purification of the crude product by dialysis followed by analysis by Nuclear Magnetic Resonance (NMR) revealed the degree of alternation in the copolymer to be 80%.

Gas oil e was a Danish automotive gas oil having density at 15° C. of 842 kg/m$^3$ viscosity at 40° C. of 2.92 mm$^2$/s, sulphur content of 0.002% w and a boiling point range: 10%=180° C. 50%=249° C. and 90%=319° C.

Gas oil f was a German automotive gas oil having density at 15° C. of 836 kg/m$^3$ viscosity at 40° C. of 3.17 mm$^2$/s, sulphur content of 0.11% w and a boiling point range: 10%=204° C. 50%=259° C. and 90%=324° C.

Gas oil g was a Swedish automotive gas oil having density at 15° C. of 801 kg/m$^3$ viscosity at 40° C. of 2.64 mm$^2$/s, sulphur content of 0.0005% w and a boiling point range: 10%=206° C. 50%=226° C. and 90%=266° C.

Gas oils a to f had aromatic contents in the region of 20 to 30% w whilst gas oil g had an aromatic content of less than 5% w.

TABLE I

| Test No. | Gas Oil | Copolymer of Ex. No. | Solution mg/kg | PP (°C.) | CFPP (°C.) |
| --- | --- | --- | --- | --- | --- |
| 1 | a | — | — | –9* | –9* |
| 2 | a | 1 | 40 | –15 | — |
| 3 | a | 1 | 600 | –21 | –17 |
| 4 | a | 1 | 1000 | –24 | –18 |
| 5 | a | 1 | 2000 | –27 | –21 |
| 6 | a | 2 | 40 | –9 | –13 |
| 7 | a | 2 | 600 | –12 | — |
| 8 | a | 2 | 2000 | –24 | — |
| 9 | b | — | — | — | –10* |
| 10 | b | 1 | 300 | — | –20 |
| 11 | b | Comp. A | 300 | — | –11 |
| 12 | b | Comp. B | 300 | — | –9 |
| 13 | b | Comp. C | 300 | — | –17 |
| 14 | c | — | — | — | –17* |
| 15 | c | 1 | 300 | — | –20 |
| 16 | c | Comp. A | 300 | — | –15 |
| 17 | c | Comp. B | 300 | — | –20 |
| 18 | c | Comp. C | 300 | — | –17 |
| 19 | d | — | — | — | –4* |
| 20 | d | 1 | 300 | — | –9 |
| 21 | d | Comp. A | 300 | — | –7 |
| 22 | d | Comp. B | 300 | — | –9 |
| 23 | 3 | Comp. C | 300 | — | –7 |

TABLE I-continued

| Test No. | Gas Oil | Copolymer of Ex. No. | Solution mg/kg | PP (°C.) | CFPP (°C.) |
| --- | --- | --- | --- | --- | --- |
| 24 | e | — | — | — | –34* |
| 25 | e | 2 | 40 | — | –42 |
| 26 | e | 2 | 300 | — | –45 |
| 27 | f | — | — | — | –10* |
| 28 | f | 1 | 300 | — | –19 |
| 29 | f | 1 | 500 | — | –20 |
| 30 | f | 3 | 300 | — | –12 |
| 31 | f | Comp. A | 300 | — | –13 |
| 32 | f | Comp. B | 300 | — | –14 |
| 33 | f | Comp. C | 300 | — | –14 |
| 34 | f | Comp. C | 2000 | — | –19 |
| 35 | g | — | — | — | –37* |
| 36 | g | 1 | 300 | — | –45 |
| 37 | g | Comp. C | 300 | — | –42 |

*PP or CFPP measurement of gas oil preheated to 50° C.

Example 5

A 50% by weight solution of the copolymer of Example 3 in toluene was incorporated into two crude oils (a' and b') preheated to 50° C. and the pour points (PP) of the resulting compositions were determined according to standard test method ASTM D97-66. Table II below shows the results obtained. In this table, the amount of copolymer solution added to the crude oil is expressed as mg polymer solution per kg crude oil ("Solution mg/kg").

Crude oil a' which was from New Zealand had density at 15° C. of 833 kg/m$^3$, viscosity at 40° C. of 3.0 mm$^2$/s, sulphur content of 0.08% w and cloud point of 50° C. Crude oil a' showed no minimum or maximum pour point behavior.

Crude oil b' which was from New Zealand had density at 15° C. of 831 kg/m3, viscosity at 40° C. of 2.9 mm$^2$/s, sulphur content of 0.077% w and cloud point of 49° C. The content of asphaltenes in crude oil b' was low; the wax content was 14.6% w. Crude oil b' showed no minimum or maximum pour point behavior.

TABLE II

| Test No. | Crude Oil | Copolymer of Ex. No. | Solution mg/kg | PP (°C.) |
| --- | --- | --- | --- | --- |
| 38 | a' | — | — | 33* |
| 39 | a' | 3 | 500 | 30 |
| 40 | a' | 3 | 1000 | 27 |
| 41 | a' | 3 | 2000 | 27 |
| 42 | a' | 3 | 3000 | 21 |
| 43 | a' | 3 | 4000 | 18 |
| 44 | b' | — | — | 33* |
| 45 | b' | 3 | 40 | 30 |
| 46 | b' | 3 | 400 | 27 |
| 47 | b' | 3 | 1000 | 27 |
| 48 | b' | 3 | 2000 | 21 |
| 49 | b' | 3 | 4000 | 12 |

*PP measurement of crude oil preheated to 50° C.

What is claimed is:

1. A copolymer of at least one n-($C_8$–$C_{30}$-alkyl) (meth) acrylate with maleic anhydride, which contains alternating (meth)acrylate and maleic anhydride monomeric units, wherein the copolymer has a degree of alternation of at least 85%.

2. The copolymer of claim 1 wherein at least one (meth) acrylate is selected from n-($C_{10}$–$C_{30}$-alkyl) (meth)acrylates and mixtures thereof.

3. The copolymer of claim 2 wherein the at least one (meth)acrylate is selected from n-($C_{12}$–$C_{24}$-alkyl) (meth) acrylates and mixtures thereof.

4. The copolymer of claim 3 wherein the at least one (meth)acrylate is selected from n-($C_{12}$-alkyl) acrylate and mixtures of n-($C_{12}$–$C_{24}$-alkyl) acrylates.

5. The copolymer of claim 2 wherein the degree of alternation is at least 86%.

6. The copolymer of claim 5 wherein the degree of alternation is at least 88%.

7. The copolymer of claim 4 wherein the degree of alternation is at least 90%.

8. A process for the preparation of a copolymer of at least one n-($C_8$–$C_{30}$-alkyl) (meth)acrylate with maleic anhydride, which contains alternating (meth)acrylate and maleic anhydride monomeric units, wherein the copolymer has a degree of alternation of at least 85%, said process comprising reacting at least one -n-($C_8$–$C_{30}$-alkyl) (meth)acrylate with maleic anhydride in the presence of a radical-forming initiator, wherein the (meth)acrylate is dosed to the maleic anhydride at a dosage rate of 20 to 100 mol % (meth)acrylate per hour, and that the ratio of the (meth)acrylate to the maleic anhydride is in the range from 1:1 to 1:5.

9. The process of claim 8 wherein at least one (meth)acrylate is selected from of n-($C_{10}$–$C_{30}$-alkyl) (meth) acrylates and mixtures thereof.

10. The process of claim 9 wherein the at least one (meth)acrylate is selected from n-($C_{12}$–$C_{24}$-alkyl) (meth) acrylates and mixtures thereof.

11. The process of claim 10 wherein the at least one (meth)acrylate is selected from n-($C_{12}$-alkyl) acrylate and mixtures of n-($C_{12}$–$C_{24}$-alkyl) acrylates.

12. The process of claim 9 wherein the degree of alternation is at least 86%.

13. The process of claim 12 wherein the degree of alternation is at least 88%.

14. The process of claim 11 wherein the degree of alternation is at least 90%.

15. A hydrocarbon oil composition comprising a major amount of a hydrocarbon oil and a minor amount of a copolymer of at least one n-($C_8$–$C_{30}$-alkyl) (meth)acrylate with maleic anhydride, which contains alternating (meth) acrylate and maleic anhydride monomeric units, wherein the copolymer has a degree of alternation of at least 85%.

16. The hydrocarbon oil composition of claim 15 wherein at least one (meth)acrylate is selected from of n-($C_{10}$–$C_{30}$-alkyl) (meth)acrylates and mixtures thereof.

17. The hydrocarbon oil composition of claim 16 wherein the at least one (meth)acrylate is selected from n-($C_{12}$–$C_{24}$-alkyl) (meth)acrylates and mixtures thereof.

18. The hydrocarbon oil composition of claim 17 wherein the at least one (meth)acrylate is selected from n-($C_{12}$-alkyl) acrylate and mixtures of n-($C_{12}$–$C_{24}$-alkyl) acrylates.

19. The hydrocarbon oil composition of claim 16 wherein the degree of alternation is at least 86%.

20. The hydrocarbon oil composition of claim 19 wherein the degree of alternation is at least 88%.

21. The hydrocarbon oil composition of claim 20 wherein the degree of alternation is at least 90%.

22. A flow improver additive comprising a copolymer of at least one n-($C_8$–$C_{30}$-alkyl) (meth)acrylate with maleic anhydride, which contains alternating (meth)acrylate and maleic anhydride monomeric units, wherein the copolymer has a degree of alternation of at least 85%.

23. The flow improver additive of claim 22 wherein at least one (meth)acrylate is selected from of n-($C_{10}$–$C_{30}$-alkyl) (meth)acrylates and mixtures thereof.

24. The flow improver additive of claim 23 wherein the at least one (meth)acrylate is selected from n-($C_{12}$–$C_{24}$-alkyl) (meth)acrylates and mixtures thereof.

25. The flow improver additive of claim 24 wherein the at least one (meth)acrylate is selected from n-($C_{12}$-alkyl) acrylate and mixtures of n-($C_{12}$–$C_{24}$-alkyl) acrylates.

26. The flow improver additive of claim 23 wherein the degree of alternation is at least 86%.

27. The flow improver additive of claim 26 wherein the degree of alternation is at least 88%.

28. The flow improver additive of claim 27 wherein the degree of alternation is at least 90%.

* * * * *